Figure 1:
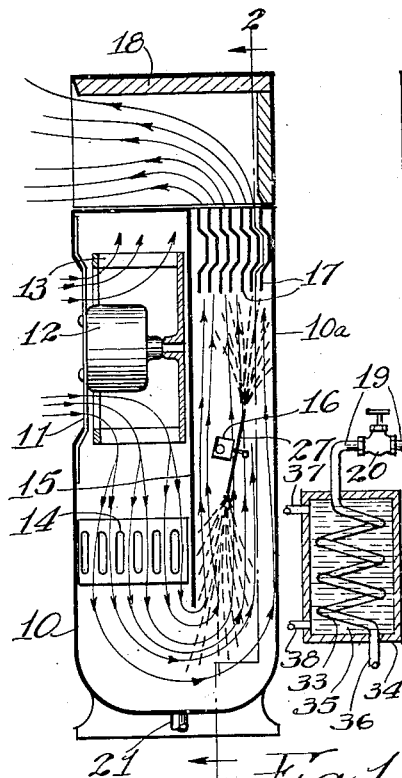

Dec. 27, 1932.  P. D. VAN VLIET  1,892,294
MEANS FOR ATOMIZING LIQUIDS AND IMPREGNATING GASES THEREWITH
Filed April 18, 1932  2 Sheets-Sheet 1

INVENTOR.
PAUL D. VAN VLIET
BY Albert C. Bell,
ATTORNEY.

Dec. 27, 1932. P. D. VAN VLIET 1,892,294
MEANS FOR ATOMIZING LIQUIDS AND IMPREGNATING GASES THEREWITH
Filed April 18, 1932   2 Sheets-Sheet 2
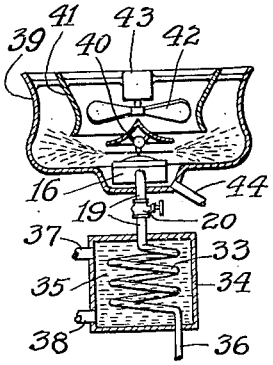
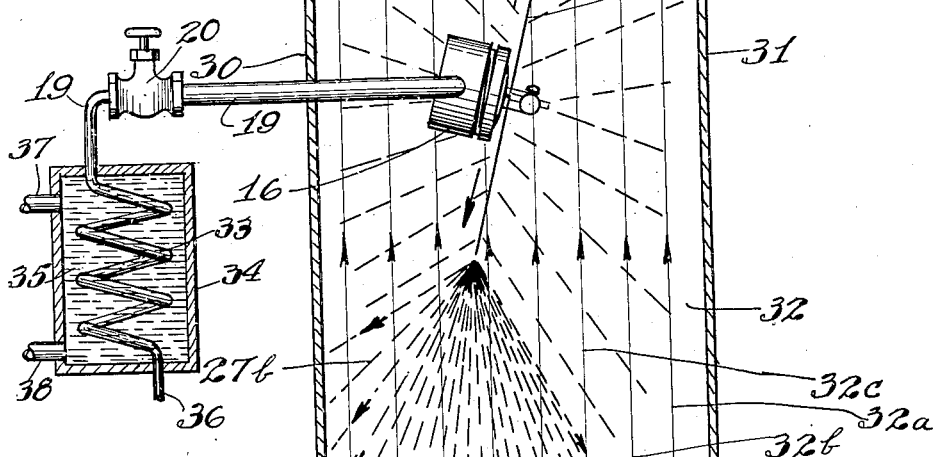
INVENTOR.
PAUL D. VAN VLIET.
BY Albert C. Bell
ATTORNEY.

Patented Dec. 27, 1932

1,892,294

UNITED STATES PATENT OFFICE

PAUL D. VAN VLIET, OF RIVER FOREST, ILLINOIS, ASSIGNOR TO AIR CONTROL SYSTEMS, INC., OF CHICAGO, ILLINOIS, A CORPORATION OF DELAWARE

MEANS FOR ATOMIZING LIQUIDS AND IMPREGNATING GASES THEREWITH

Application filed April 18, 1932. Serial No. 605,920.

My invention relates to improved means for atomizing liquids by forming thin liquid films therefrom with sufficient velocity flow to break up the films into minute particles presenting a very large aggregate surface to the gas or gases for purposes of interaction, and passing gases through the atomized liquids, for example in restricted passageways, or by restricted or defined gas flow.

In many instances in which it is desired to impregnate or treat a desired gas with liquid of one kind or another for purposes of heat transfer or of washing said gas, the gas flow is preferably restricted or defined, for example, by a passageway of restricted dimension in one direction extending transversely of the direction of flow of the gas through the passageway, and in such cases, the effectiveness of the interaction between the gas and the liquid, is determined by the manner in which the liquid is broken up into minute particles, the degree to which such break-up occurs, and particularly the completeness of the dispersion of the liquid particles into the flowing gas.

Where the gas flow is restricted, for example, by a passageway restricted as to one dimension transversely of the gas flow, and particularly where the length of the passageway is necessarily short, the time interval of association of the gas with the minute particles of liquid is necessarily short, and unless the atomization of the liquid is very fine, and unless the small particles of the liquid are disposed in the passageway to be effectively engaged by the gas flowing through said passageway, the interaction of the liquid with the gas is small.

By my invention I provide atomizing devices which operate effectively at relatively low pressures, for example, from ten to fifteen pounds per square inch on the liquid in the receptacle of the atomizing devices, to produce a thin and preferably circular film of the liquid to be atomized, the film forming parts being preferably so proportioned that the velocity of flow in the liquid film is substantial, so that when the surface tension of the liquid is overcome by the flow velocity of the film and the attenuation of its outermost portion, the liquid film breaks up uniformly around its periphery into minute particles of the liquid which have sufficient remaining velocity to project them in diverging directions from the edge of the film, so that, for example, where a restricted passageway is employed, it is substantially filled with a mist of the minute liquid particles, and thus gas flowing through the passageway must necessarily flow through the liquid mist produced, and come into intimate contact with the minute particles of liquid throughout the length of the passageway, and in this manner, effective interaction between the liquid particles and the gas results, and furthermore, the action tends to clean the gas if there are soluble odors, or particles of dirt or foreign matter in it. It will be understood that the pressures referred to may be increased substantially above fifteen pounds per square inch, with satisfactory results but with some increase in the sound of atomization.

This effect is secured in large measure by my invention, by disposing the film forming devices in such position, that the plane of the liquid film produced is in the general direction of the gas flow, thereby avoiding undesirable effects that would otherwise occur. This arrangement of the liquid film relatively to the gas flow, offers substantially no retardation to the flow of the gas, the liquid particles effectively interact with the flowing gas, and the flowing gas produces no damaging distortion of the liquid film.

My invention is particularly applicable as an example of its use, to air conditioning mechanism of the console type, which mechanism must necessarily be small so that it may be conveniently used in the rooms of homes. Such mechanisms are preferably not to exceed two and one-half feet to three feet in width, they are preferably of about the same height, and preferably not to exceed ten to eighteen inches in depth from front to rear. Such air conditioning mechanism must provide means for moving the air through it, such as a motor and fan, also means for heating or cooling the air in its passage through the mechanism, and means for conditioning the air before it is delivered from the mechanism. This necessarily restricts the spray compartment to but part of the size of the mechanism as a whole, with the result that the spray compartment is of restricted depth from front to rear of the mechanism, for example, from three to nine inches, although the length vertically of said compartment may be from eighteen to twenty-four inches, and the width of said compartment may be of substantially the width of the air conditioning mechanism. Such mechanism is necessarily provided with a water sprayer or atomizer operating under pressure, and a drain for removing surplus water from the mechanism.

With air conditioning mechanism of the kind referred to, any attempt to use ordinary water spraying devices of the kind used for sprinkling lawns, to condition the air, is quite ineffective on account of the small size of the spray compartment and the short time interval that the air is in contact with the water spray in said compartment.

In connection with air conditioning mechanism, to avoid the considerable noises resulting from spraying water or atomizing it under high pressure, for example from forty to one hundred pounds per square inch, or more, on the water supply connected with the spraying or atomizing devices, I provide film forming and atomizing devices operable on low pressure as above defined, for example, from ten to fifteen pounds per square inch, and thus avoid the high pitch hissing noise accompanying the atomizing of liquid at high pressure, the only noise produced in using my atomizing devices, being a low pitched, low intensity hum which is not objectionable when the mechanism is in operation. In connection with air conditioning mechanism, the cleaning action on the air by the atomized water is particularly important, since it is desirable that the air delivered by the mechanism shall be thoroughly washed of soluble odors, dirt or dust carried by it, which is effectively accomplished by the devices of my present invention.

Figure 2:
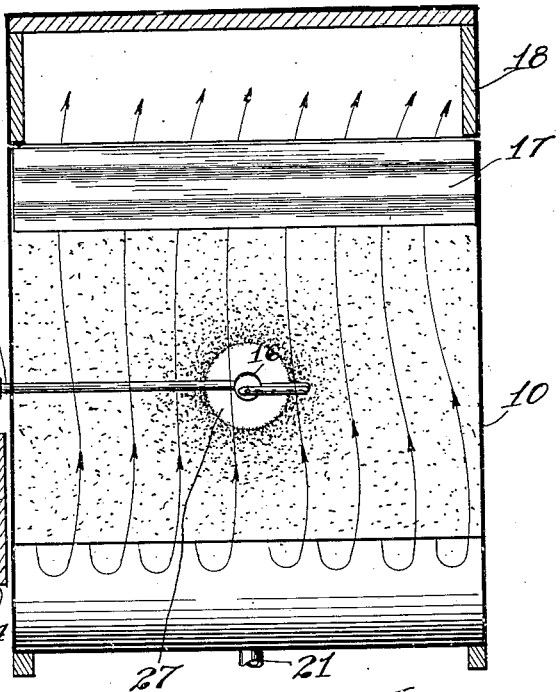
Figure 3:
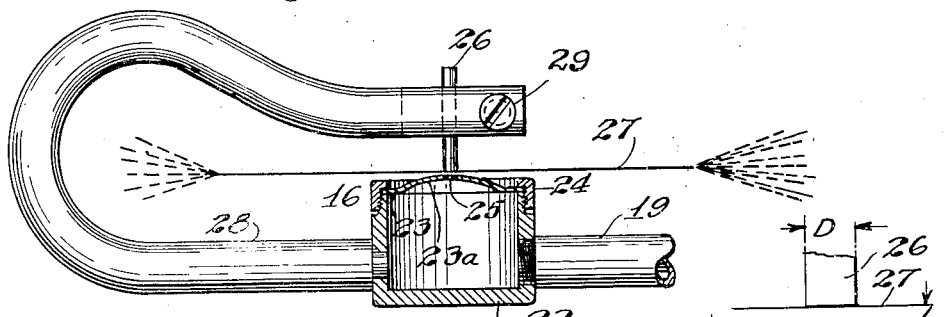
Figure 5:
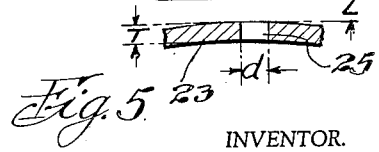
Figure 4:
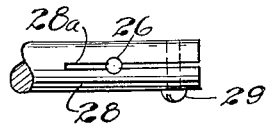

My invention will best be understood by reference to the accompanying drawings illustrating a preferred embodiment thereof, in which Fig. 1 illustrates in vertical, sectional view, an air conditioning mechanism of the console type, in which film forming devices are located in the spray compartment, to condition the air in accordance with my invention, Fig. 2 is a vertical, sectional view of the parts shown in Fig. 1, taken along the line 2—2, Fig. 3 shows in side elevation to an enlarged scale, the film forming devices preferably employed, Fig. 4 is a plan view of a part of the structure shown in Fig. 3, immediately over the orifice or nozzle of the film forming devices, Fig. 5 is a diagrammatic view to an enlarged scale, showing the proportions and relation of the parts of a film forming device found desirable in carrying out my invention, Fig. 6 illustrates in a view similar to Fig. 1 and to an enlarged scale, the relation of gas flowing through a restricted passageway generically, to atomize liquid with which said gas is to be impregnated, and Fig. 7 illustrates a modified form of apparatus that may be employed to carry out my invention.

Similar numerals refer to similar parts throughout the several views.

As shown in Fig. 1, I illustrate at 10 the casing of an air conditioning mechanism, having an inlet opening at 11 back of which a motor 12 and fan 13 are disposed. The fan 13 is located in a front compartment of the casing 10 and projects the air downwardly in said compartment through a heat transfer mechanism 14 from which the air passes below the lower edge of a partition 15 and into the spray compartment between the partition 15 and the rear wall 10a of the casing. The air passes upwardly in the spray compartment due to the action of the fan 13, past the film forming devices 16, and from the upper portion of the spray compartment between plates 17 employed to remove surplus moisture from the air, from which the conditioned air is projected upwardly into the hood 18 of the mechanism, from which hood the conditioned air is directed horizontally through a discharge opening in its front wall. As shown in Fig. 2, the film forming devices 16 are located at substantially the mid portion of the spray compartment and are supplied with water under pressure through a pipe 19 controlled by a valve 20. The lower part of the casing 10 is provided with a drain pipe 21 for removing surplus moisture from the mechanism.

The film forming devices 16 are preferably constructed as shown in Figs. 3 and 4. As shown in these figures, the pipe 19 communicates with a receptacle 22 which is cylindrical in form and has an open end closed by a diaphragm 23 of thin sheet metal, which is held in place on the end of the receptacle 22 by a threaded ring 24. The central portion of the diaphragm 23 is dished outwardly as indicated at 23a, so that its outer surface is somewhat outside of the outer end surface of the ring 24. The diaphragm 23 is provided with a central orifice or nozzle 25 which is in line with a round abutment or rod 26 having a squared end in the path of water flow through the orifice 25. The orifice 25 and the abutment or rod 26 are preferably proportioned and related as below described, to form a thin water film 27 which flows outwardly in all directions from the rod 26 so that said film is substantially circular in form where it breaks up into minutely atomized particles.

The rod 26 is supported in line with the orifice 25 by an arm 28 secured at one end to the receptacle 22 and extended outwardly and bent to surround a part of the film 27 without contact with said film, the upper end portion of the arm being substantially parallel with the extreme outer surface of the diaphragm 23. The upper end of the arm 28 is preferably cut longitudinally as shown at 28a in Fig. 4, and the rod 26 is disposed in a seat extending through the cut portion of the arm, in line with the orifice 25, so that it may be held at any desired distance from the said orifice by a clamping screw 29 extending through the end portion of the arm. Where the end of the rod 26 adjacent the diaphragm 23 is a plane surface substantially perpendicular to the axis of the rod, and substantially parallel with the outer surface of the diaphragm 23, the water projected through the orifice 25 strikes the central portion of the end of the rod and continues to flow outwardly in all directions to produce the film 27, the size of the orifice 25 being determined by the pressure employed on the water in the receptacle 22, and the thickness and velocity of the film 27 desired.

In carrying out my invention, I prefer to proportion the parts of the film forming devices so that the film 27 will be thin and of substantial diameter, for example from three to five inches, to the end that the velocity flow in the film may be sufficient to project the finely atomized water resulting from the breaking up of the film at its outer edge, to all parts of the spray compartment as illustrated in Fig. 2. The paths of flow of the air through the mechanism shown in Figs. 1 and 2 are illustrated by continuous lines carrying arrow-heads, the distribution of the air flowing through the spray compartment, being substantially uniform. It is to be noted that the plane of the film 27 in Fig. 1 is substantially in the direction of air flow through the spray compartment, the slight tilting of the film serving to effectively distribute the atomized water in the compartment. Bearing in mind that the distribution of atomized water from the film occurs uniformly around the entire film, it will be noted that the distribution of the atomized water in the spray compartment due to the direction of the plane of the film 27 indicated in Fig. 1, substantially fills the spray compartment with atomized water, the particles of water being so fine that they float freely to all parts of the compartment. This results in substantially filling the compartment with atomized water, as a result of which the air flowing through it may be effectively conditioned and cleaned. The atomizing effect is in general best when the gas moves in parallelism with the film, but inclination of the film may be permitted provided the gas pressure against it does not become sufficient to distort it to a damaging extent.

On account of being continually in contact with atomized water in the spray compartment, the air flowing upwardly through the spray compartment may be effectively conditioned to any desired degree of humidity, notwithstanding that the vertical height of the spray compartment in which the conditioning action can take place, is small.

In Fig. 5 I illustrate to an enlarged scale, proportions which may satisfactorily be employed for the rod 26, the orifice 25 and the separation of the rod 26 from the diaphragm 23. I find that for low pressure on the water, the diameter of the orifice or nozzle 25 may be from four to six hundredths of an inch, the thickness of the diaphragm 23 preferably being approximately the same as the orifice diameter, and in any event, I find that the diameter $d$ of the orifice may be at least as great or slightly greater than the length T of the orifice; also that the distance L between the discharge end of the orifice and the adjacent end of the rod 26, may be substantially equal to or slightly greater than the diameter $d$, and that the diameter D of the rod 26 may be substantially fifty per cent greater than the diameter $d$. By adhering generally to these proportions, and to the lower water pressures described, the high pitched hissing noise commonly present in connection with the use of atomizing devices involving high pressures, is eliminated.

It is desirable that the receptacle 22 shall have a substantial diameter relatively to the diameter of the orifice 25, for example from at least eight to ten times the orifice diameter, although a larger inner diameter of the receptacle 22 is not objectionable. The length of the receptacle 22 axially should be great enough to insure symmetrical flow of the water in the receptacle to the orifice 25. The end of the rod 26 adjacent the orifice 25 may be a plane surface perpendicular to the axis of the rod, or it may be coned outwardly or inwardly, or it may be of convex curvature or of concave curvature as desired, as long as the departure from a plane surface does not interfere with forming the film 27, nor with the dispersion of the liquid particles in the spray compartment. With the end of the rod 26 of curved or conical formation, the film produced will depart from a plane surface and be convex or concave towards the rod 26, depending upon the direction in which the liquid leaves the periphery of the face of the rod adjacent the orifice 25. I find that very effective results are produced by the film forming devices, where the film forming end of the rod 26 is a smooth, plane surface perpendicular to the axis of the rod 26, or substantially so, and where the axis of the rod 26 is coincident with the axis of the orifice or nozzle 25, but I wish it understood that my invention includes other shapes of the film forming end of the rod and other relations of the parts, producing cupped or non-plane films where the cupping of the film is insufficient to harmfully reduce the atomizing effect.

While I have described the film forming devices as used with water, to form a water film and subsequently to produce a finely atomized condition of water, it will be understood that said film forming devices are equally effective in producing a film from and a finely atomized condition of many other liquids, as may be desired.

In Fig. 6 I illustrate generically, film forming devices 16 disposed in a passageway 32 having walls 30 and 31 restricting the size of the passageway in one direction transversely of its length, the devices 16 being placed in the passageway similarly to the relation of the film forming devices in the spray compartment above described. Gas is caused to flow through the passageway 32 by any suitable means, along paths indicated by the lines 32a, 32b, 32c, and in the direction indicated by the arrow-heads on said lines. The liquid film 27 flows outwardly in all directions from the film forming devices at relatively high velocity, as indicated by the arrows adjacent the film, and the film breaks up into atomized liquid as illustrated at 27a, 27b, the small arrows in connection with the atomized liquid indicating the direction of projection and the velocity of the atomized liquid particles relatively to the velocity of liquid flow in the film. It will be noted that although the larger part of the velocity flow of the liquid in the film, is dissipated by the breaking up of the film into the atomized particles, the particles still have sufficient velocity to project them in the diverging directions indicated, not only in the plane of the film, but also obliquely to the plane of the film and on both sides thereof, so that atomized particles of the liquid are projected to all parts of the passageway. Thus gas traveling through the passageway, passes through the atomized liquid below the film forming devices and also through the atomized liquid above the film forming devices. The low velocity of the atomized particles of liquid, produces no appreciable retarding effect on the gas flow through the passageway, and yet is sufficient to maintain the distribution of the atomized particles throughout the passageway, since the velocity of the gas flow through the passageway is preferably small.

From the above it will be observed that I provide means for effectively atomizing liquid in a restricted or defined gas flow, consisting essentially of a nozzle and an abutment which is preferably round, in alignment with the discharge end of the nozzle, said abutment having a film forming surface against which a liquid stream is projected from said nozzle, the nozzle and abutment being preferably connected by a suitable support to maintain a definite relation between them, the plane of the film forming surface of the abutment being substantially in the direction of the gas flow, as a result of which the flowing gas is brought intimately into contact with the minute particles of the liquid to effectively interact with them and to be effectively cleaned by the action of the liquid particles where such cleaning action is desired.

In Fig. 1 I illustrate heat transfer mechanism 14 for action upon the gas, for example air, it being understood that similar mechanism may be used for action upon the gas in Fig. 6, if desired, and in Figs. 2 and 6 I illustrate diagrammatically, heat transfer mechanism for action upon the liquid. As shown in Figs. 2 and 6, the pipe 19 extends from the valve 20 to a coil 33 in a tank 34 containing a heat transferring medium 35, the coil 33 being supplied with the liquid by a pipe 36 from any suitable source not shown. Where the medium 35 is a fluid, it may be delivered to and from the tank 34 by pipes 37 and 38 extending to any suitable source not shown. Where it is desired to extract heat from the gas or from the liquid, or both, before effecting interaction between the gas and the atomized liquid, the heat transferring medium supplied to the mechanism 14 or to the tank 34, or both as the case may be, is given a lower temperature than the temperature of the gas supplied to the mechanism 14, or of the liquid supplied to the coil 33, or both, and where on the other hand, it is desired to supply heat to the gas or to the liquid, or both, before effecting said interaction, the heat transferring medium supplied to the mechanism 14 or to the tank 34, or both as the case may be, is given a higher temperature than the temperature of the gas supplied to the mechanism 14, or of the liquid supplied to the coil 33, or both, it being understood that any desired heat transfer, or no heat transfer, may be effected by the mechanism 14 in any particular case, and that at the same time any desired heat transfer whether similar in kind or degree to that then being effected by the mechanism 14 or not, or no heat transfer, may be effected by the coil 33. The heat transferring mechanisms described are illustrative only, and it will be understood that I may employ any devices known to the art for effecting such heat transfer.

In Fig. 7, I illustrate a modified form of mechanism for treating gas with atomized liquid, by which a relatively large amount of the gas, for example the air in a room, may be treated or conditioned as desired and circulated by simple means. As shown in Fig. 7, I provide a bowl 39 containing in its lower central portion, film forming devices 16 below a baffle 40 of conical formation. Within the bowl 39 and above the baffle 40, and preferably concentric with the bowl, a sleeve 41 is disposed to direct the gas into and from the bowl. While the transverse area of the passageway between the sleeve and the bowl may have any desired relation to the transverse internal area of the sleeve, I prefer that said passageway area shall be less than said sleeve area.

A fan 42, driven by a motor 43, is mounted in or adjacent to the sleeve 41, to cause the gas to flow through said sleeve. The bowl is provided with a drain pipe 44, and the film forming devices 16 may be supplied with liquid in the manner above described in connection with Figs. 2 and 6.

With the structure illustrated in Fig. 7, gas may be treated with desired liquid, the fan causing movement of the gas through the sleeve and around its lower end and through the passageway between the sleeve and the bowl, the direction of said gas movement being determined by the direction of rotation of the fan. The gas in its movement around the lower end of the sleeve is caused to flow through the finely atomized liquid and is thus effectively treated by the liquid. I thus provide a means for effecting circulation in a body of gas which may be large relatively to the mechanism employed to treat the gas, which will effectively treat the entire body of gas with desired liquid, for example, the air in a room may be treated and conditioned as desired.

Although I have herein described my invention as applied to the impregnation of a gas with a liquid, as in conditioning air, I wish it understood that my invention is equally applicable to the impregnation or mixture of a gas with a liquid for other purposes, both with and without vaporization or condensation of the liquid.

While I have shown my invention in the particular embodiment above described, it will be understood that I do not limit myself to this exact construction as I may employ equivalents known to the art at the time of the filing of this application without departing from the scope of the appended claims. I therefore wish my description and drawings to be taken as in a broad sense illustrative or diagrammatic rather than as limiting me to my precise showing herein. In particular I wish it understood that my mechanism is applicable not only for humidifying air but also for cooling or dehumidifying it, and that also my atomizing device may be applied to a wide variety of uses independently of the specific air conditioning structure with which it is illustratively herein shown.

In particular it will be understood that when in the specification or claims I use the term "parallel" or "parallelism" in connection with the relationship between the film and the gas being treated, I mean to include more or less curvilinear movement as well as rectilinear movement, as in the case where the film may be somewhat dished or cupped and the air or gas being treated moves in general conformity to the surface of the film.

What I claim is:

1. In a device for treating a gas, a treating chamber, atomizing means positioned in said chamber, and discharging from a predetermined center a relatively flat thin film of liquid extending radially from said center, and means for maintaining through said chamber a flow of the gas to be treated in a direction in general parallelism with the plane of the film.

2. In a device for treating a gas, a relatively flat extended treating chamber, atomizing means positioned in said chamber, and discharging from a predetermined center a relatively flat thin film of liquid, said film being in general parallelism with the maximum extension of the chamber, and means for causing a flow through said chamber of the gas to be treated, while maintaining said film substantially undistorted by gas pressure.

3. In a device for treating a gas, a treating chamber, atomizing means positioned in said chamber, forming a relatively thin film of liquid spaced from the chamber walls and means for maintaining through said chamber a flow of the gas to be treated, and for causing that portion of the gas which approaches the film to flow in contact with and along the film in a direction conforming generally to the surface defined by the film.

4. Mechanism for conditioning air consisting of the combination of a casing of the console type having an air passageway therethrough comprising in part a compartment of restricted depth relatively to the width and length of said compartment, means for moving air through said passageway, and a water atomizing device in said compartment comprising a nozzle and an abutment in line with said nozzle and having a film forming surface extending transversely of the axis of said nozzle and substantially parallel to the flow of air through said compartment, whereby water is atomized in said compartment around said film and the air moving through said compartment passes through said atomized water.

5. Means for treating gas with liquid particles, consisting of the combination of walls defining a passageway for the flow of gas of restricted dimension in one direction transversely of the length of said passageway, a liquid atomizing device in said passageway comprising a nozzle and an abutment in line with said nozzle and having a liquid film forming surface extending transversely of the axis of said nozzle and substantially parallel to the flow of gas through said passageway, and means for moving the gas to be treated through said passageway.

6. Means for treating gas with liquid particles, consisting of the combination of walls defining a passageway of restricted dimension in one direction transversely of the length of said passageway, a liquid atomizing device in said passageway comprising a nozzle and an abutment in line with said nozzle and having a liquid film forming surface extending transversely of the axis of said nozzle and substantially parallel to the flow of gas through said passageway, and means for moving the gas to be treated through said passageway, said devices including a support connecting said nozzle and said abutment, said support extending around and outside of said film.

7. Means for treating gas with liquid particles, consisting of the combination of a liquid atomizing device comprising a nozzle and an abutment having a liquid film forming surface in the path of liquid flow from said nozzle and extending transversely of the axis of said nozzle, and means for producing gas flow along and in general parallelism with said film.

8. Means for treating gas with liquid particles, consisting of the combination of a receptacle having bottom and side walls, a device for producing an unsupported liquid film in said receptacle adjacent and generally parallel with its bottom wall and breaking at its edge into finely atomized particles, and means for directing a gas stream into said receptacle, through said atomized particles and from said receptacle.

9. Means for treating gas with liquid particles, consisting of the combination of a receptacle having bottom and side walls, a device for producing an unsupported liquid film in said receptacle adjacent and generally parallel with its bottom wall and breaking at its edge into finely atomized particles, means for directing a gas stream into said receptacle, through said atomized particles and from said receptacle, and baffle means in said receptacle adjacent said liquid film and protecting the same from distortion by said gas stream.

10. Means for treating gas with liquid particles, consisting of the combination of a device for producing an unsupported liquid film breaking at its edge into finely atomized particles, means for directing a gas stream towards and transversely of said liquid film, and baffle means in the path of said gas stream and protecting said liquid film from distortion by said gas stream.

In witness whereof, I hereunto subscribe my name this 9th day of April, A. D. 1932.

PAUL D. VAN VLIET.